United States Patent [19]
Larson

[11] 3,845,968
[45] Nov. 5, 1974

[54] WHEELED CARRIER FOR REFUSE CONTAINERS

[76] Inventor: Mary E. Larson, P.O. Box 458, Key Largo, Fla. 33037

[22] Filed: Jan. 2, 1974

[21] Appl. No.: 429,709

[52] U.S. Cl.................. 280/36 C, 214/381, 248/98, 248/129, 280/47.24
[51] Int. Cl.............................................. B62b 1/06
[58] Field of Search........... 280/47.24, 47.26, 47.28, 280/36 C; 214/381, 384, 380; 248/129, 98

[56] References Cited
UNITED STATES PATENTS

| | | | |
|---|---|---|---|
| 769,625 | 9/1904 | Parks et al. | 248/98 X |
| 1,438,334 | 12/1922 | Sabin | 248/129 X |
| 1,873,690 | 8/1932 | Ward | 214/380 |
| 2,472,670 | 6/1949 | McFarland | 214/384 |
| 3,718,337 | 2/1973 | Vosbikian | 280/47.26 |

Primary Examiner—David Schonberg
Assistant Examiner—John A. Pekar
Attorney, Agent, or Firm—Ernest H. Schmidt

[57] ABSTRACT

A collapsible wheeled carrier for refuse containers in the general form of a hand truck and having securing means attachable, selectively, to handle portions of standard metal or molded plastic trash containers is described. Auxilliary attachment means is also provided for circumferentially supporting the open end of a plastic trash bag for convenient use and transportation from place to place in lieu of metal or molded plastic refuse containers.

10 Claims, 11 Drawing Figures

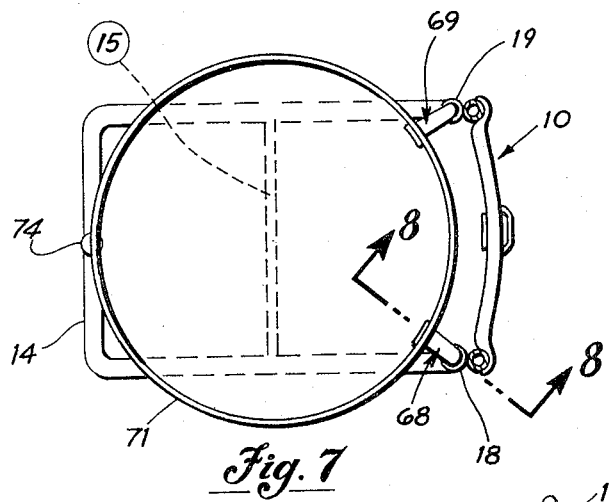
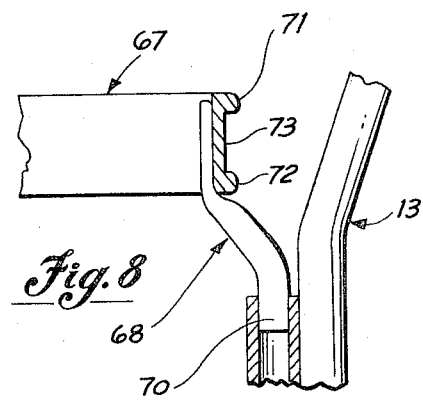
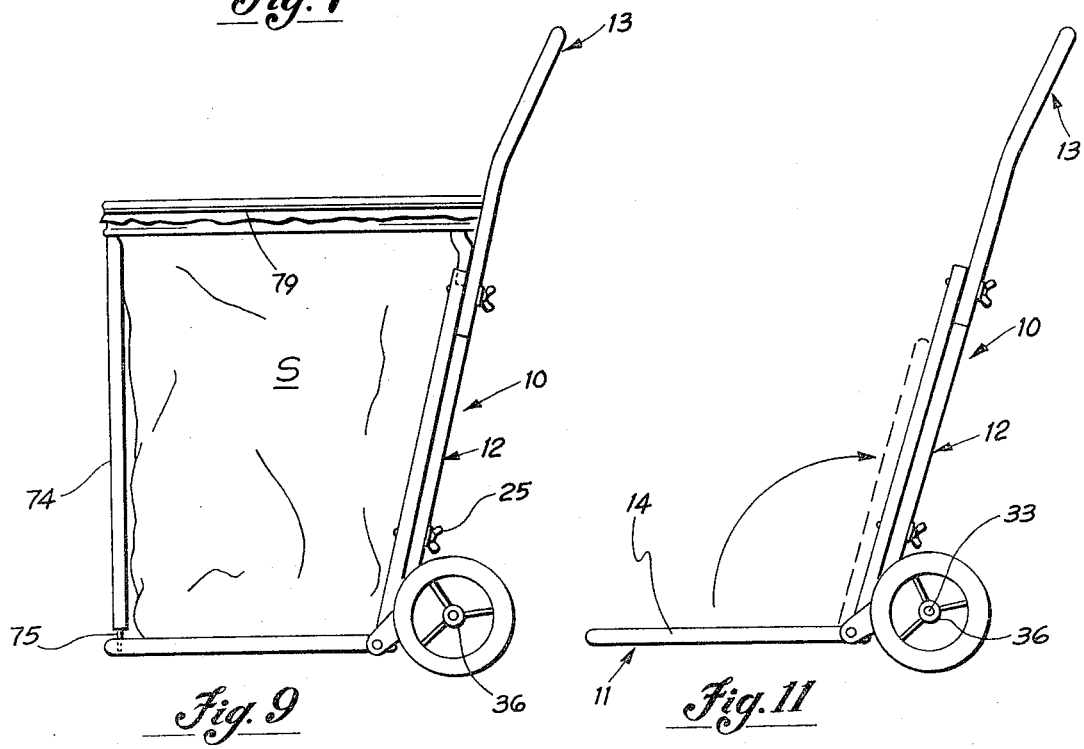
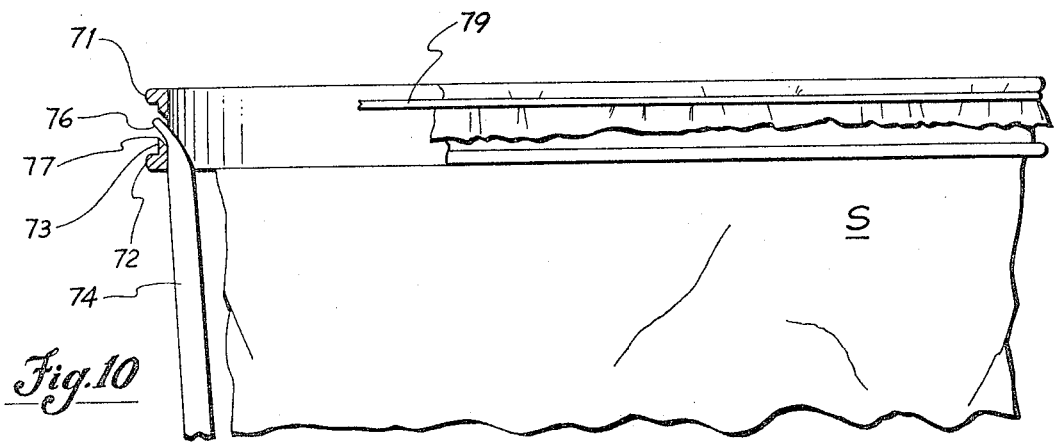

WHEELED CARRIER FOR REFUSE CONTAINERS

This invention relates to hand trucks and is directed particularly to a wheeled carrier or hand truck for supporting and transporting ordinary household refuse or garbage cans or containers.

The principal object of this invention is to provide a hand truck-like wheels carrier for ordinary household refuse or garbage containers that not only supports a container from underneath, but also attaches to a side wall handle of the container to retain it securely in place while being wheeled from one location to another.

Another object of the invention is to provide a wheeled refuse container of the above nature which is readily adjustable for use with various different sizes or refuse containers.

Yet another object of the invention is to provide a wheeled refuse container of the above nature including means for attaching, selectively, either to the bail type handle of an ordinary galvanized metal refuse container, or the inverted recess handle opening in ordinary molded synthetic plastic refuse containers.

Another object of the invention is to provide a wheeled refuse container carrier of the above nature wherein the container cover can readily be removed and replaced while its associated container is secured in place thereon.

Still another object of the invention is to provide removable means for peripherally supporting the upper open end of a sheet plastic refuse bag in upstanding relation for use in lieu of a rigid container.

Yet another object of the invention is to provide a wheeled refuse container carrier of the above nature which, because of its unique operational features, is particularly well suited to use in retirement homes, for example, and by elderly or handicapped homeowners.

Another object of the invention is to provide a wheeled refuse container carrier of the character above described which will be compactly collapsible for convenient storage and transportation, which will be light in weight, simple in construction, inexpensive to manufacture, attractive in appearance and durable in use.

Other objects, features and advantages of the invention will be apparent from the following description when read with reference to the accompanying drawings. In the drawings, wherein like reference numerals denote corresponding parts throughout the several views:

FIG. 7 is a top view of the wheeled carrier as in FIG. 1, but equipped with a removable hoop member for suspension of a sheet plastic refuse bag used for collecting refuse in lieu of a metal or molded plastic refuse container;

FIG. 8 is a fragmentary cross-sectional view taken along the line 8—8 of FIG. 7 in the direction of the arrows and illustrating constructional details of the hoop member attachment device;

FIG. 9 is a side elevational view of the wheeled carrier illustrated in FIG. 7, shown with a sheet plastic refuse bag assembled to the supporting hoop member;

FIG. 10 is a partial side elevational view, as in FIG. 9 but on an enlarged scale, illustrating constructional details of the supporting hoop and the method of attachment of the upper end of the sheet plastic refuse bag thereto; and FIG. 11 is a side elevational view of the wheeled carrier for refuse containers, shown separately and illustrating how the base support assembly can be folded up against the back of the carrier for compact storage of the device when not in use.

Figure 1:
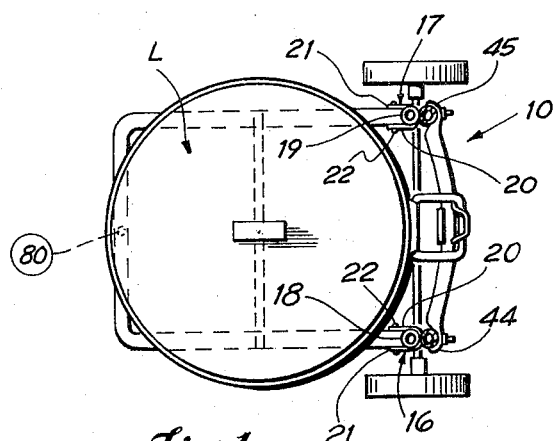
FIG. 1 is a top view of a wheeled refuse container embodying the invention, shown with a metal refuse container supported thereon.

Referring now in detail to the drawings, reference numeral 10 in FIG. 1 designates, generally, a preferred form of wheeled refuse container carrier embodying the invention, the same being comprised of a container base support assembly 11, a wheel frame assembly 12 and a handle assembly 13 all of which can be readily disassembled, each from the other, without tools, for compact storage and transportation, as is hereinbelow more particularly described.

The container base support assembly 11 is preferably fabricated of bent metal tubing, such as of aluminum tubing, and comprises a U-shaped base frame member 14 having a cross bar 15 riveted or otherwise affixed between the opposed leg portions thereof at central positions therealong. As illustrated, the base frame cross bar 15 may be fabricated of comparatively small diameter aluminum tubing. The outer ends of the opposed legs of the base frame member 14 are hinged, as by hinges 16 and 17, to spaced, parallel, upstanding side members 18, 19 also of metal tubing. The hinges 18 and 19 each have forewardly off-set side wall portions 20, 21 carrying pintles 22 journalling respective end portions of the opposed legs of the base frame member 14 somewhat inwardly of the outer ends thereof so that said outer ends will abut against respective end portions of the upstanding side members 18 and 19 when said base frame member is swung outwardly to an extent slightly greater than 90 circular degrees with respect to said upstanding side members. It will thus be noted that the hinges 16 and 17 permit the base frame member 14 to be pivotally swung between the collapsed position illustrated by the broken-line representation thereof in FIG. 11 to the full line representation thereof as an operational limit position.

Figure 2:
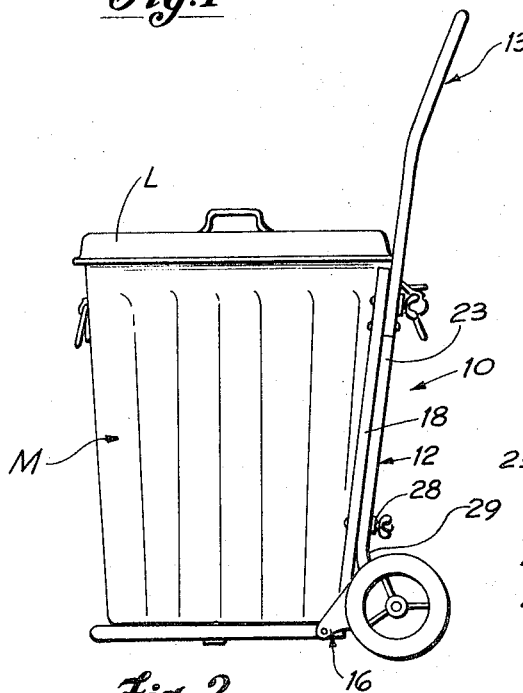
FIG. 2 is a side elevational view of the wheeled refuse container carrier and metal refuse container illustrated in FIG. 1.
Figure 3:
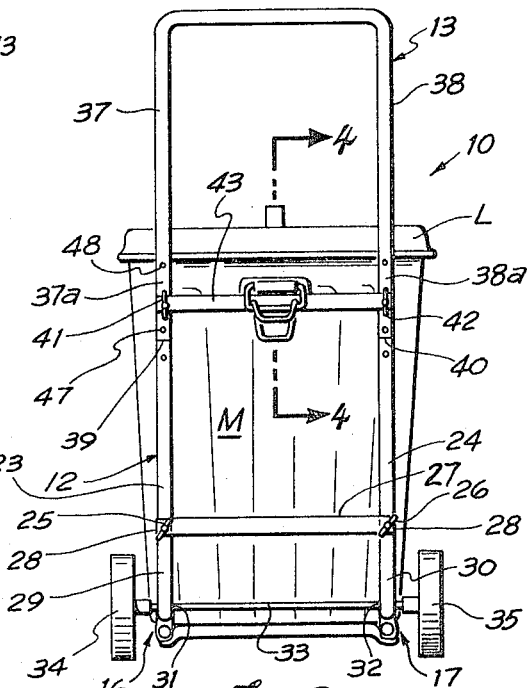
FIG. 3 is a rear elevational view thereof.

The wheel frame assembly 12 comprises a pair of spaced, parallel wheel support frame members 23, 24 (see FIG. 3), also fabricated of bent metal tubing, lower end portions of which, as illustrated in FIGS. 2 and 3, are removably secured in back-to-back alignment with respective upstanding side members 18 and 19 of the container base support assembly 11 as by wing-nut bolts 25 and 26. The wing nut bolts 25 and 26 also support, in assembled relation against the outsides of the wheel support frame members 23 and 24 in transverse relation with respect thereto and thereinbetween, an arcuate cross bar 27, also of metal tubing, outer end portions of which are arcuately flattened, as indicated at 28, for conforming fit. Lower portion of the wheel support frame member 23, 24 are arcuately outwardly bent, as indicated at 29 and 30, respectively. Outermost end portions of the bent lower ends 29 and 30 are provided with transversely aligned through openings 31, 32, respectively, journalling a transverse axle 33 carrying on outwardly extending end portions thereof, a pair of rubber-tired wheels 34, 35 retained in place as by friction washers 36 press-fitted in place.

The handle assembly 13 is also fabricated of tubing bent into U-shape with substantially rectangular corners to provide opposing legs 37 and 38 each of which are bent at obtuse angles approximately mid-way along their length to define angularly-bent end portions 37a, 38a. The handle assembly legs 37 and 38 are disposed in spaced, parallel relation at a spacing distance substantially equal to that of the distance between the wheel support frame member 23 and 24, and the upper ends of said wheel support frame members are formed with short, reduced-diameter end portions 39 and 40 telescopingly received within the end openings of said opposing handle assembly legs, respectively, for removable interconnection therewith. A second pair of wing nut bolts 41, 42 secure the handle assembly 13 to the respective upstanding side members 18, 19 of the base support assembly 11. The wing nut bolts 41 and 42 also secure in place a second framework cross bar 43 of arcuate shape so as to be somewhat concave as seen from the front of the refuse container carrier. The second framework cross bar 45 is also preferably fabricated of metal tubing, and is provided with arcuately flattened end portions 44, 45 for conforming abutment against curved outer wall portions of the handle assembly legs 37 and 38. The upstanding side members 18 and 19 of the container base support assembly 11, and the respective opposing legs 37 and 38 of the handle assembly 13 are provided with a plurality of longitudinally-spaced, aligned sets of diametrically-extending through openings, indicated at 47 and 48, to provide for vertically-adjusted positioning of said handle assembly with respect to said base support assembly for the purpose hereinafter appearing.

Centrally positioned along the second framework cross bar 43 and secured thereat as by bolt 49 is a container handle attachment assembly 50. The container handle attachment assembly 50 comprises a bent hook plate 51 having an upstanding plate portion 52 at the front of the second framework cross bar 43 and an arcuately-curved portion 53 seated against the underside of said second frame-work cross bar 46 and through which the bolt 49 extends. The upper end edge of the upstanding portion 52 is convexly arcuately curved. The rearwardly-extending portion 54 terminates in a tight roll 54 defining a substantially cylindrical through opening 54a within the ends of which is pivotally arranged a toggle latch mechanism 55. The toggle latch mechanism 55 is formed of bent wire, and comprises a lever member 56 and a bail hook member 57. The lever member 56 is symmetrical in shape and formed at each side with an end portion received within respective ends of the transverse cylindrical opening 54a, a short, right-angularly bent portion 58 which extends into a 360° circular degree loop 59 merging into a further outwardly-extending portion 60 of substantially greater length and which, at its outer end, is bent in substantially parallel relation with respect to the hinge portion 54 to merge with its corresponding symmetrical portion at the other side of said lever member. The bail hook member 57 is also of bent wire, and at its ends comprises opposed, inwardly-directed pivot portions 61 pivotally received within the respective openings defined by the circular loops 59 of the lever member 56, which end portions extend substantially at right angles into slightly arcuate spaced, parallel, side portions 62, 63 merging in opposed, downwardly and reversely-bent portions 64, 65, the outer ends of which merge in a connecting, somewhat curved, bridge portion 66. The reversely-bent portions 64, 65 define laterally-spaced recesses or bights for the interhooking reception of one of the bail handles of a metal refuse container, as is hereinbelow more particularly described.

Removable means are provided for supporting on the container carrier 10 a plastic liner bag in open relation at its upper end, in substitution for a metal or rigid plastic trash container. To this end, a circular hoop member 67, which may be formed of sheet metal or molded plastic, is provided, the diameter of which is about equal to the diameter at the open end or mouth of an ordinary sheet plastic trash bag S when held in a circle (see FIGS. 8, 9 and 10). At spaced positions about its periphery, the hoop member 67 has secured thereto, at the inside, plug members 68, 69 having outwardly off-set, downwardly-extending, parallel plug portions 70 (only one shown in FIG. 8) so spaced and of such diameter as to be telescopingly interfittingly engageable within the open upper ends of the upstanding side members 18, 19 of the base support assembly 11.

The hoop member 67 is formed about its outer periphery with outwardly rolled, upper and lower marginal edge portions or beads 71, 72, respectively, defining therebetween an outer peripheral recess 73 for use in attaching the plastic trash bag S to said hoop, as is hereinbelow particularly described.

Means is also provided for supporting the front or forward end of the hoop member 67 when installed on the refuse container carrier 10. To this end, a vertical support rod 74 is provided, which also is preferably fabricated of metal tubing, said support rod being formed at its lower end with a coaxial, outwardly-extending pin portion 75 receivable in an opening 80 centrally located in the front of the base support assembly 11 and, at its upper end, with a flattened portion 76 off-set to the inside as illustrated in FIG. 10 to interhookingly engage, from underneath, with a slot-like opening 77 in the hoop member 67. It will thus be understood that the hoop member 67 can readily be assembled to and removed from the refuse container carrier as needed, and that when installed will be firmly supported not only at the back where it connects with the base support assembly 11, but also at the front, whereat is braced by the support rod 74.

Figure 6:
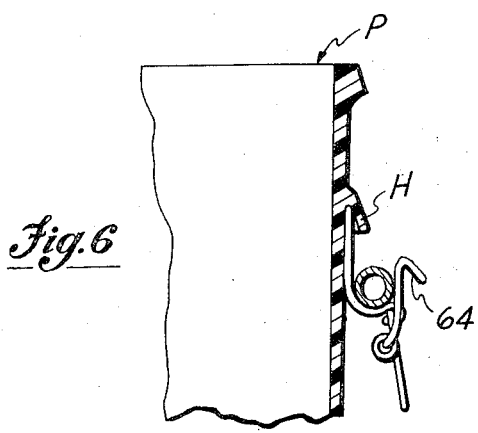
FIG. 6 is a vertical cross-sectional view taken along the line 6—6 of FIG. 5 in the direction of the arrows and illustrating the interlocking of the handle attachment mechanism with the handle of the molded plastic refuse container illustrated in FIG. 5.
Figure 5:
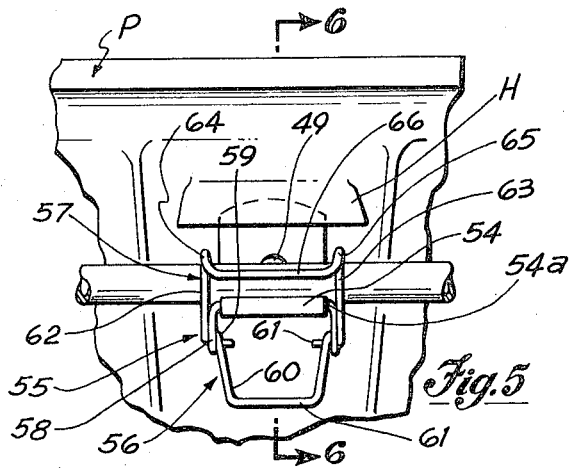
FIG. 5 is a partial rear elevational view of the wheeled carrier, illustrating how the container handle attachment mechanism alternatively secures a molded plastic trash container in place.

As illustrated in FIGS. 5 and 6, in the use of the refuse container carrier 10 with a standard 20 or 30 gallon plastic trash container, indicated at P, said container will be set in place upon the base support assembly 11 thereof in such a manner that the usual downwardly-extending recess defined by one of the molded handles H of the plastic container has interhookingly received therein the upstanding plate portion 52 of the hook plate 51 comprising the container handle attachment assembly 50. The sets of through openings 47, 48 in the upstanding side members 18, 19 and the adjacent legs portions of the handle assembly 13 provide for raising or lowering the second framework cross bar 43 and its container handle attachment assembly 50 to accommodate the particular size of refuse container being used. Once the container has been so fitted on the carrier, it can be wheeled about in ordinary fashion, whether full or empty, without danger of tipping or displacement of the container.

Figure 4:
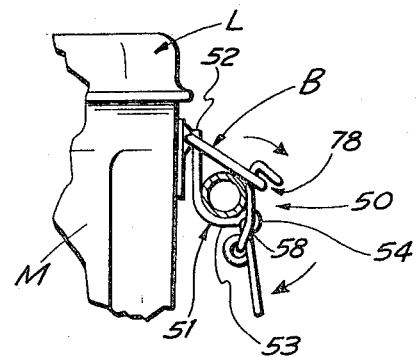
FIG. 4 is a fragmentary, partly cross-sectional view taken along the vertical line 4—4 of FIG. 3 illustrating mechanical details of the container handle attachment mechanism.

As illustrated in FIGS. 1 through 4, in the use of the refuse container carrier 10 with a standard galvanized metal trash container M, it will be set in place upon the base support assembly 11 thereof with one of the usual handle bails B facing to the rear for application thereto of the container handle attachment assembly 50. In this connection, it is to be noted that, as described above with reference to interhooking attachment with a plastic container, the associated framework cross bar 43 will first have been moved and affixed to the proper position along the back of the carrier to be in register with the container handle. Thereafter the lever member 56 will be moved upwardly to carry its associated bail hook member 58 forwardly and upwardly to permit downward movement of the metal refuse container bail handle B into interhooking engagement with the bights 78 defined by said bail hook members (only one illustrated in FIG. 4). Thereupon, the lever member 56 will be turned downwardly to the full-line position thereof as illustrated in FIG. 4 to carry the bail hook member 58 rearwardly and downwardly to such an extend that the refuse container bail handle B is locked securely in place. In this connection, it is to be noted that the toggle action afforded by the locking mechanism by virtue of the pivotal axis of the bail hook member 58 passing under and forewardly of the pivotal axis of the lever member 56, serves to resiliently retain the locking mechanism in interhooking engagement with the trash container handle or bail B. To release the trash container, it is only necessary to flip the lever member 56 rearwardly and upwardly, whereupon the container bail B can readily be removed to free the container.

It is to be noted that the rearward off-set of the handle assembly 13 with respect to the upstanding side members 18, 19 of the container base support assembly 11 provides enough circumferential clearance at the top of the container to permit ready placement and removal of a container cover L, as illustrated in FIG. 2.

If a plastic liner bag is to be used with the hoop assembly 67, the hoop member will be fitted in place, as illustrated in FIGS. 8 through 10, whereupon the liner bag S can be hung in place in lieu of a container, with its mouth held open by folding the marginal peripheral portion at its open end over the outside of said hoop member and thereafter applying a resilient loop or band 79, which may be of elastic cord or in the form of a coil spring, about the outside of the hoop member so that it frictionally secures said bag in place within the external peripheral recess 73.

An important advantage of the refuse container carrier hereinabove described resides in the fact that not only is it light in weight and easy to handle, but it also securely attaches to the trash container with which it is used, whether of molded plastic or metal, and no matter what size. The carrier can thus be confidently and easily rolled from place to place, even over rough lawns and the like with minimum danger of displacing or tipping over the carried container.

While I have illustrated and described herein only one form in which my invention can conveniently be embodied in practice, it is to be understood that this form is given by way of example only and not in a limiting sense. The invention, in brief, comprises all the embodiments and modifications coming within the scope and spirit of the following claims.

What I claim as new and desire to secure by Letters Patent is:

1. A wheeled carrier for refuse containers comprising, in combination, a base frame member, a pair of spaced, parallel, upstanding side members, hinge means hinging said base frame member at one end to the lower ends of said upstanding side members, said hinge means comprising mechanism limiting pivotal movement of said base frame member between a collapsed position upwardly in face-to-face relation against said upstanding side member and an outwardly swung position defining an angle of approximately 90° with respect to said upstanding side members, a wheel frame assembly, said wheel frame assembly comprising a pair of spaced, parallel, elongate wheel support frame members, means for removably securing said wheel support frame members in co-extensive, abutting relation, respectively, with one each of said upstanding side members, lower end portions of said wheel support frame members each comprising at their lower ends, parallel, outwardly-extending curved portions, an axle extending transversely through aligned openings in the outer ends of said curved portions, a pair of wheels journalled one each upon outer end portions of said axle, a handle member of U-shaped configuration defining a pair of spaced parallel leg portions, means interconnecting terminal end portions of said handle leg portions with upper end portions of said upstanding side members, a first cross bar, means for removably securing said cross bar between said upstanding side members and said wheel support frame members near the lower ends thereof, a second cross bar, means for adjustably securing said second cross bar between said handle legs, a container handle attachment means centrally disposed along said second cross bar, said attachment means comprising toggle mechanism interconnectable with a bail handle of a trash container supported on said base support assembly.

2. A wheeled carrier for refuse containers as defined in claim 1 wherein said attachment means further comprises an upstanding plate portion adapted to interhookingly engage, selectively, with the downwardly-extending handle recess of a molded plastic refuse container.

3. A wheeled carrier for refuse containers as defined in claim 1, wherein said means for adjustably securing said second cross bar between said handle legs comprises said means for interconnecting terminal end portions of said handle leg portions with upper end portions of said upstanding side members, and wherein said terminal end portions of said handle leg portions are disposed in off-set relation with respect to the upper ends of said upstanding side members to provide space for the application and removal of a container cover lid of a trash container supported on said base support assembly.

4. A wheeled carrier for refuse containers as defined in claim 3, wherein said second cross bar is of arcuate configuration along its length extending to the rear of said base frame member to define space for the reception of peripheral rear wall portions of a trash container supported on said base support assembly.

5. A wheeled carrier for refuse containers as defined in claim 4, wherein said means for removably securing said first cross bar, and said means for adjustably securing said second cross bar comprise a plurality of wing-nut bolts.

6. A wheeled carrier for refuse containers as defined in claim 5, wherein said means for adjustably securing said second bar further comprises pairs of horizontally-aligned through openings in said terminal end portions of said handle leg portions and upper end portions of said upstanding side members for selective reception of said wing-nut bolts.

7. A wheeled carrier for refuse containers as defined in claim 1, including means for supporting a plastic liner bag in opened condition and in spaced relation above said base frame member when said base frame member is in its outwardly swung position.

8. A wheeled carrier for refuse containers as defined in claim 7, wherein said means for supporting a plastic liner bag comprises a circular hoop member and means for removably attaching said circular hoop member with respect to upper end portions of said upstanding side members.

9. A wheeled carrier for refuse containers as defined in claim 8, wherein said means for removably attaching said circular hoop further comprises a pair of plug members secured in spaced, parallel relation about the periphery of said circular hoop member and telescopingly receivable, one each, within the open ends of said upper end portions of said upstanding side members.

10. A wheeled carrier for refuse containers as defined in claim 9, wherein said means for removably attaching said circular hoop further comprises a support rod and means for removably attaching the ends of said support rod between said base frame member and said circular hoop member.

* * * * *